L. H. LANIER.
ICE CREAM CONE MACHINE.
APPLICATION FILED FEB. 21, 1910.
1,028,035.
Patented May 28, 1912.
5 SHEETS—SHEET 4.
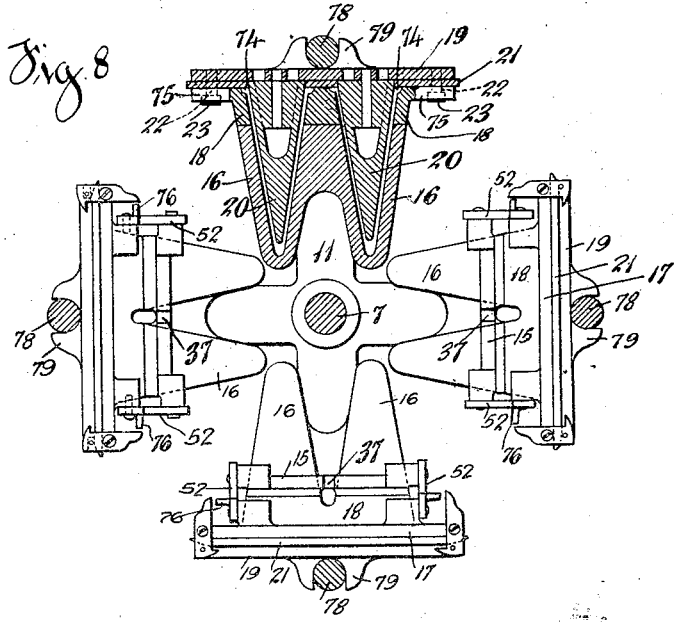
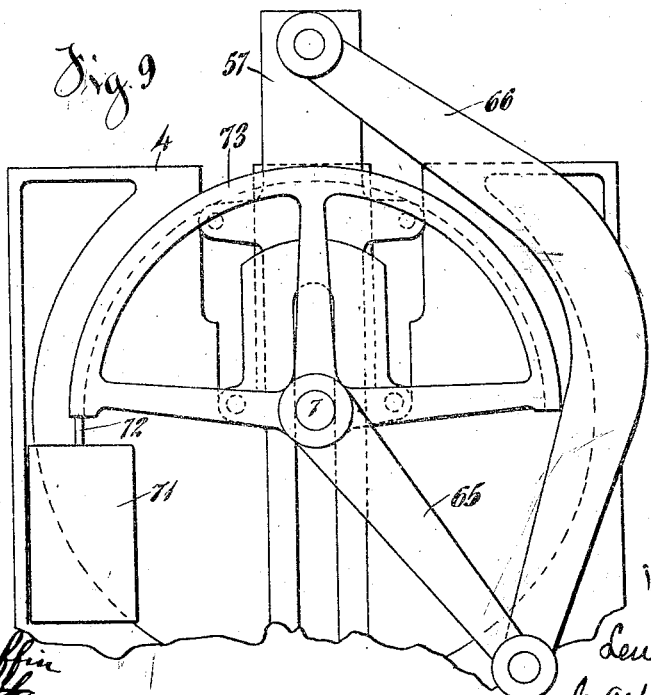
Witnesses
Inventor
Lewis H. Lanier
by Alfred M. Allen
Attorney

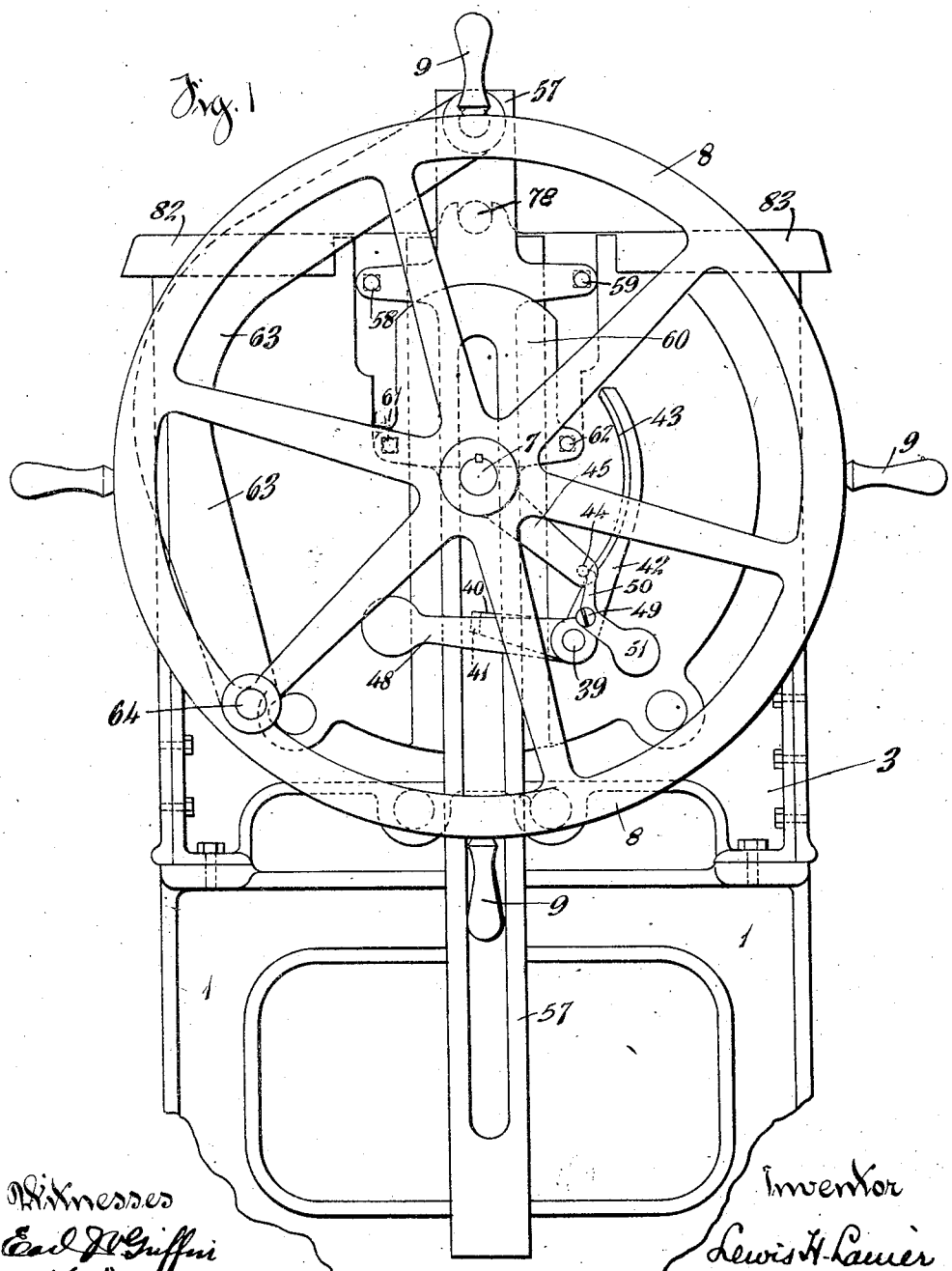

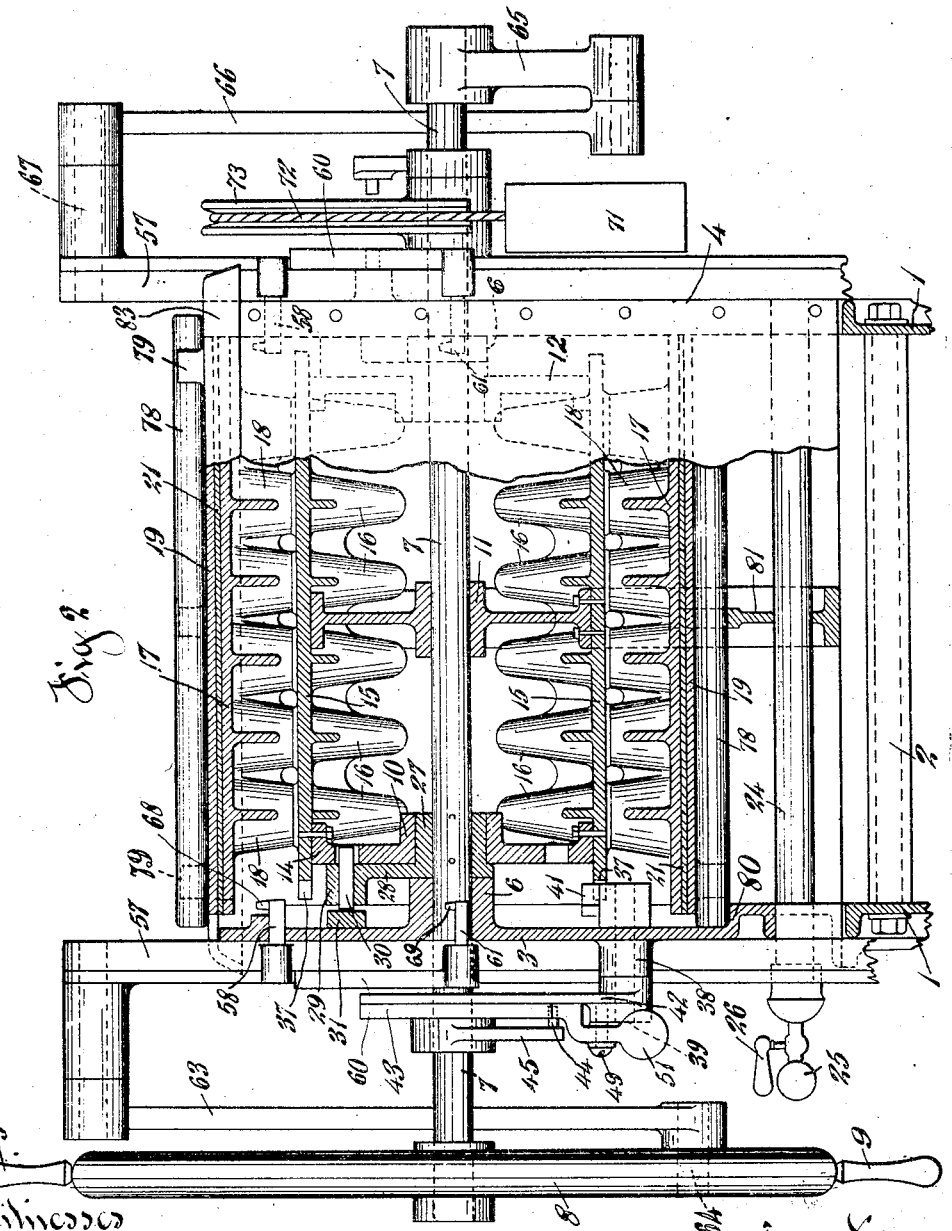

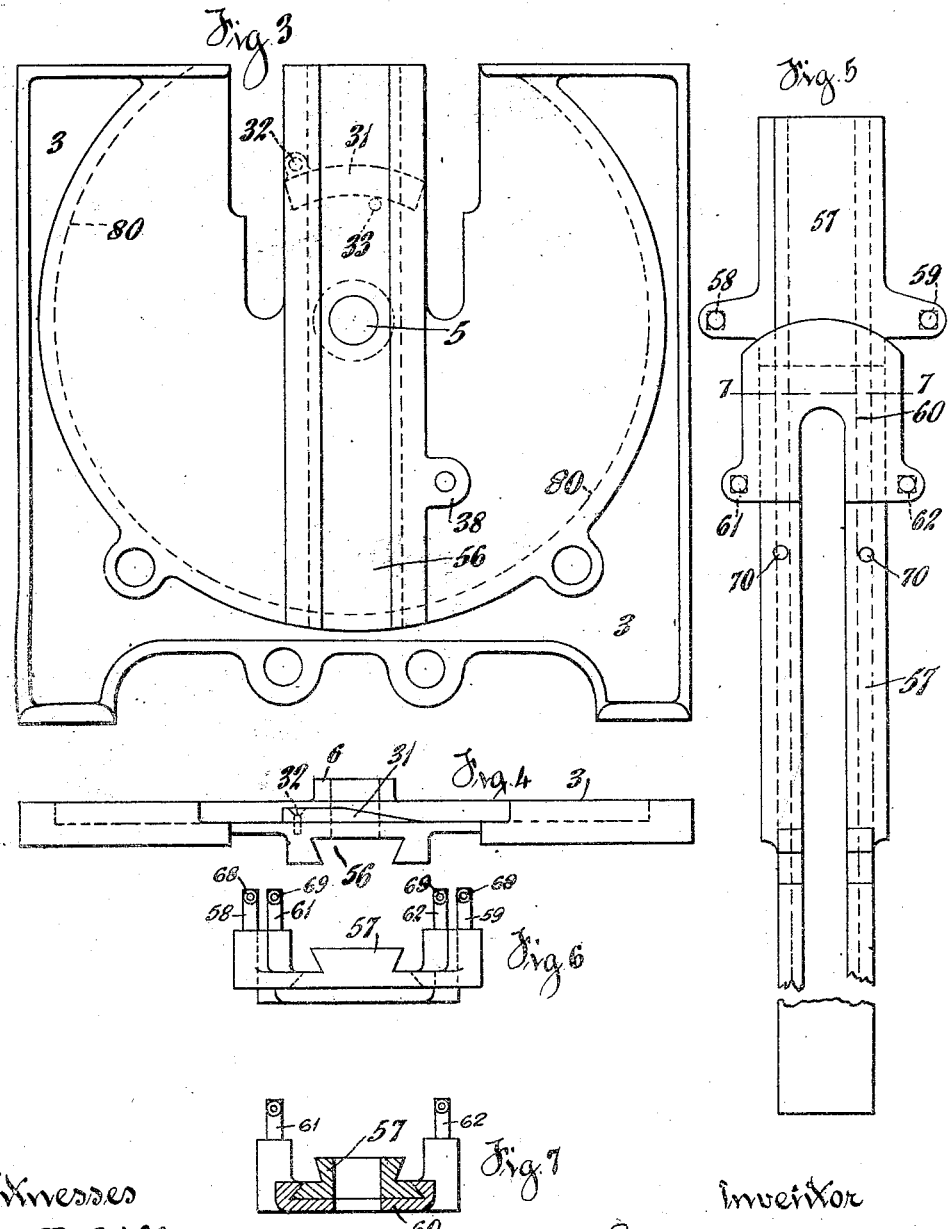

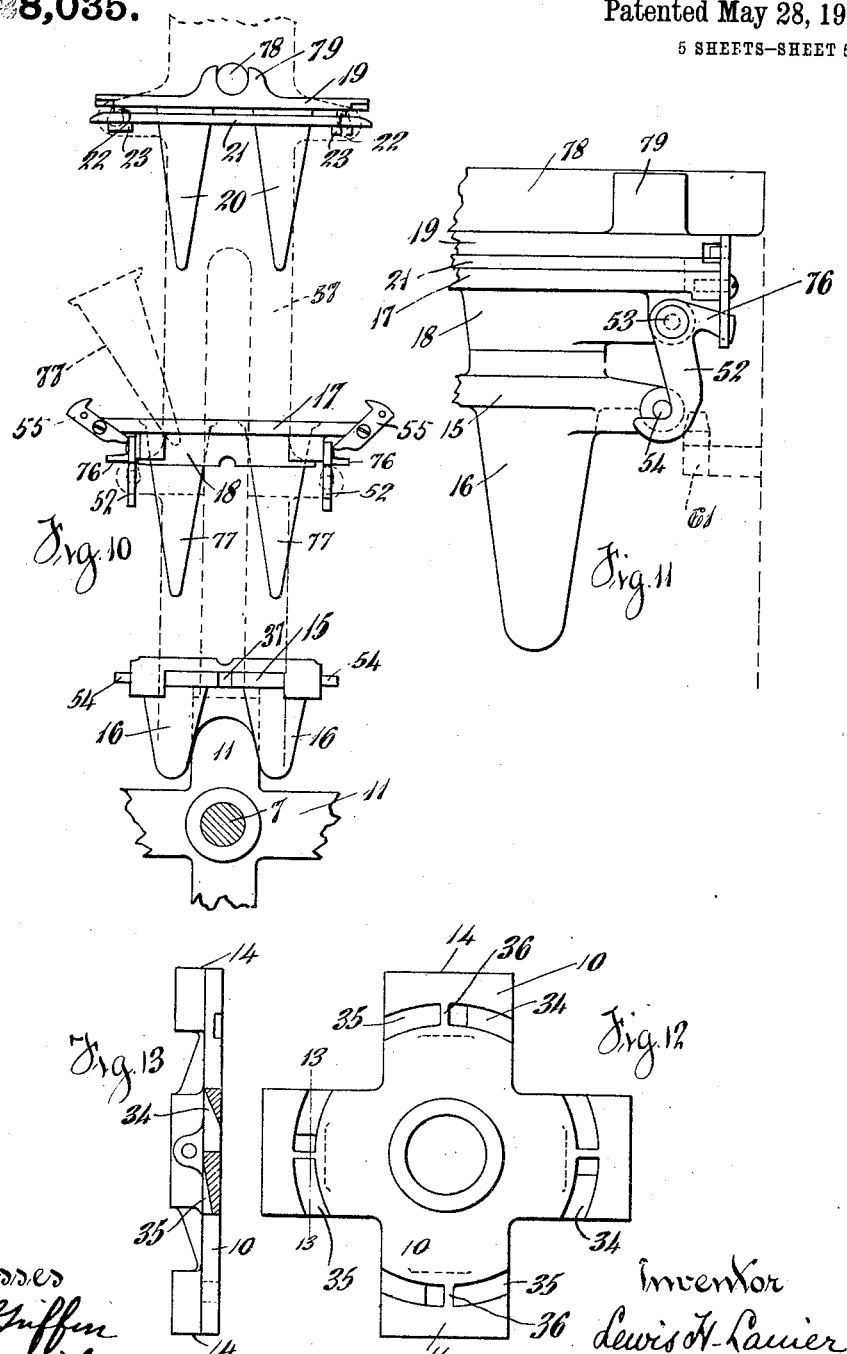

UNITED STATES PATENT OFFICE.

LEWIS H. LANIER, OF NEWPORT, KENTUCKY, ASSIGNOR OF ONE-HALF TO LUDWIG L. STRICKER, OF CINCINNATI, OHIO.

ICE-CREAM-CONE MACHINE.

1,028,035.  Specification of Letters Patent.  Patented May 28, 1912.

Application filed February 21, 1910.  Serial No. 545,164.

*To all whom it may concern:*

Be it known that I, LEWIS H. LANIER, a citizen of the United States, and a resident of the city of Newport, in the county of Campbell and State of Kentucky, have invented certain new and useful Improvements in Ice-Cream-Cone Machines, of which the following is a full, clear, and exact description, reference being had to the accompanying drawings, forming a part of this specification.

My invention relates to machines for molding and baking pastry molds such as have come generally into use as receptacles for ice cream and the like, and the object of my invention is to provide a machine in which such cones can be molded in large quantities easily and rapidly, and in which the cones may be baked thoroughly and with great uniformity.

My invention consists of that certain novel construction and arrangement of parts to be hereinafter pointed out and claimed, and the several features of my invention and the various advantages resulting from their use conjointly or otherwise will be apparent from the following description and claims.

In the drawings, Figure 1 is a front elevation of my improved machine with the lower portion of the supporting standards broken away. Fig. 2 is a central vertical section of the same. Fig. 3 is a side view of one of the end plates for supporting the operating mechanism. Fig. 4 is a top plan view of the same. Fig. 5 is a front view in detail of one of the mold lifting slides. Fig. 6 is a top plan view of the same. Fig. 7 is a cross section on the lines 7, 7, of Fig. 5. Fig. 8 is a rear elevation of the upper portion of the machine partly in section. Fig. 9 is an end elevation of the mold partly in section. Fig. 10 is an end elevation of the molds, showing the mold plates and cores in elevated position. Fig. 11 is a detailed side view of one of the molds of one set. Fig. 12 is a front view of one of the spiders or frames for supporting the molds. Fig. 13 is a side view partly in vertical section taken on the line 13, 13 of Fig. 12.

1, 1, represent the supporting standards for the operating parts which are suitably braced together by cross braces 2, to form a substantial framework to support the operating parts. Securely bolted on top of this framework are the front and rear plates 3, 3, forming the framework for the operating parts. These plates are formed with the central opening 5 around which the metal is formed into a hub 6, and in these plates the main operating shaft 7 is mounted. This shaft is provided in front with a wheel 8 keyed on the end of the shaft, and handles 9, 9 extend out radially from the periphery of the wheel for rotating the shaft in either direction. Mounted loosely on this shaft is the mold frame carrying the molds. There are four sets of these molds with a double set of molds in each mold section, and with the sections arranged around the shaft 7 ninety degrees apart.

Mounted loosely on the shaft 7 are the spider frames 10, 11 and 12, the front one of which, 10, is illustrated in Figs. 12 and 13. Securely bolted on the outer ends 14 of the spider arms are the plates 15, in which plates are formed the lower portion of the molds 16. Each plate is provided with a longitudinal series of these molds arranged in two rows, as many molds being provided in a row as desired and the dimensions of the machine may permit.

Loosely mounted on top of these lower plates are the plates 17 which carry the upper portion 18 of the molds. These mold parts correspond in number to the lower mold sections and are formed so as to accurately register with the lower sections and to form together a cone shaped mold.

19 is the top or cover plate for the molds, and this plate has secured thereto and depending therefrom the cores 20, while immediately underneath the core plate 19 is a stripper plate 21 which is suspended from and secured to the under surface of the core plate by the dowel pins 22, 22, at the four corners, these dowel pins provided with heads 23, to permit the stripper plate to drop away a short distance from the under surface of the core plate when the core is raised.

My description in connection with these molds has referred to the construction of one of the four mold sections, but it will be understood that all of the molds are constructed in exactly the same way, so that the description of one of the sets will apply to them all, and I have, therefore, used similar reference characters for the various mold parts of each section.

Before describing the details of the operation in connection with the use of the molds, I will first describe the method of rotating the molds.

It will be understood that the heat for baking the cone is applied to the molds in any convenient way, and the preferable method as illustrated is by means of a pair of tubular gas burners 24, arranged underneath the molds lengthwise thereof, one at each side and supplied with gas through the pipe 25 controlled by the cock 26.

The batter for making the cones is supplied to the uppermost side of the molds; then the molds are rotated a quarter of a turn which brings another set of the molds to the top from which the baked cones are removed and new batter supplied, and then the molds again rotate another quarter of a turn, and so on continuously. The heat from the burner or other source of supply is acting on the material in the molds, so that until baked they are subjected to the heat continuously and on all sides.

For rotating the molds a quarter of a turn, I provide as follows:—As already stated, the spiders 10, 11 and 12 separating the frames are loosely mounted on the shaft 7. The front spider 10 is mounted, however, on the hub 27 of a driving arm 28 which is keyed to the shaft 7 so as to always rotate with it. This arm 28 carries on its outer end 29 a pin 30, loosely mounted in the end of the arm, to slide parallel with the shaft 7.

Pivoted on the inner face of the plate 3 is a beveled segment 31, shown in section in Fig. 2 and in dotted lines in Fig. 3. 32 is the pivot for this segment, and the segment is held in position by the stop 33 on the inner face of the plate.

The outer face of the spider 10 is provided with correspondingly beveled segmental recesses 34, 35, one set for each arm of the spider, and the inclination of are beveled faces of the grooves is in the same direction as illustrated in Fig. 13.

It will be evident from this construction that as the shaft 7 with its operating wheel 8 is rotated from right to left, that the loose pin 30 sliding in the end of the driving arm 28 will travel up the bevel on the segment 31 and will be pushed into the groove 34; then as the rotation is continued, the pin will abut up against the shoulder 36 and the movement of the driving arm will carry the molds with it.

When a quarter of a turn has been given to the molds, in order to lock the molds in position during the subsequent operations to be hereinafter described, I provide as follows: A slot 37 is cut in the edge of the ends of each mold plate 15. Pivotally mounted in a suitable bearing 38 in the casing is a rock lever 39, provided with an arm 40 formed with a lug 41, adapted to enter the slot 37 in the mold plate, and this lever has the outside arm 42 provided with a segmental contact surface 43 and arranged to lie in the pathway of a roller 44 on the end of the arm 45 keyed to the shaft 7. The rock lever is also provided with a weighted arm 48 to return it to its normal position, which is with the lug 41 in engagement with the slot 37 in the mold plate. As the shaft is rotated from right to left, however, the rock lever is shifted to the right, which raises the lug out of the slot 37 and releases the molds. In the rotation of the shaft 7 and arm 45, the roller 44 finally passes beyond the end of the arm 42 and the weighted arm 48 rocks the lever 39 to the left and causes the molds to become again locked. Now as the shaft 7 is rocked from left to right, the locking arm 42 lies on the left of the roller 44 and the molds remain locked, as the shaft 7 is rocked back to its original position. In order that the roller 44 may pass by the locking arm 42 on the return stroke, I cut away the contact surface of the locking arm from its pivotal center outward for a short distance, and pivot at 49 on the locking arm 42 a short arm 50 which closes up this space, when the contact roller 44 is on the left of the arm 42, and it swings out of the way during the return stroke of the arm 45. A weight 51 is provided for this short arm 50, so that normally the contact surface for the locking arm 42 is unbroken. In this way, the molds are locked in position except when they are to be given a quarter of a turn.

In order to automatically raise and lower the core plate and the movable sections of the molds, I provide as follows: The upper section of the molds 18 is normally locked to the lower section 16 by the hook 52 which is pivoted at 53 to the upper section and engages a pin 54 on the lower section. The core plate 19 and the stripper plate 21 are normally locked together and to the upper sections of the molds by the catches 55, 55, pivoted to the plate 17 and engaging over the edge of the core plate.

It is necessary that the upper section of the mold proper shall be lifted as well as the core plate and the stripper plate, and to accomplish this I provide the vertical dovetailed grooves 56 in the outer faces of the plates 3 and 4, and in these grooves I mount the dove-tailed slides 57, one for each end of the machine. This slide is provided with the inwardly projecting arms 58 and 59, and there is also mounted on the outer surface of the slide 57 another slide 60 which carries the inwardly projecting arms 61, 62.

The upper end of the slide 57 is connected by the connecting bar 63 with a stud 64 on the operating wheel 8. The opposite end of the shaft 7, as shown in Fig. 2, is provided with the crank arm 65 connected by connecting bar 66 with the stud 67 on the slide 57 at the other end of the machine, so that in the operation of the operating wheel, the two slides move together.

The inner ends of the projecting arms 58 and 59 on the main slide 57 and the inner ends of the projecting arms 61, 62, on the supplemental slide 60 for each end of the machine are provided with the upwardly extending lugs 68, 68 for the arms 58 and 59, and 69, 69 for the arms 61 and 62, and these lugs come in contact with the under edge of the core plate and the plate for the upper section of the molds during the raising of the slides. The raising arms on the slides are spaced apart, so that the upper arms will first raise the core plate and then the lower arms will follow and raise the upper section of the molds. This movement is brought about by rotating the shaft 7 by the operating handles 9 from left to right. It will be evident that this movement will raise the connecting bars 63, 66, and that the main slides 57, 57, will be raised. Pins 70, 70, are provided on the main slide 57 to support the slide 60 and carry them up in the movement of the main slides. The distance between the lifting arms 58, 59, and 61, 62, in order to raise the two sets of plates of the mold properly, is such that in the return of the slides to normal position, the shaft 7 would interfere with the return of the arms 61, 62, and therefore these arms are mounted on a separate slide which allows the separate slide to move upwardly when coming in contact with the shaft to permit the main slide to return to its normal position.

As the sections of the molds and the core plates are of considerable weight, I provide a counter weight 71, which is connected by a rope 72 to the segment 73, keyed to the shaft 7, as shown in Figs. 2 and 9.

The operation of my machine is as follows:—Let us assume that the molds have been filled and baked and the apparatus is in the position illustrated in Figs. 1 and 2. In order to open up the molds, the operator rotates the shaft 7 by the handles 9 a quarter of a turn from left to right. This movement raises the slides 57 and 60 at the front and rear of the machine, and in the first part of the movement the arms 58, 59, at each end come in contact with the under surface of the core plates. This movement, therefore, raises the core plate. The stripper plate 21, however, being hung on the core plate by the dowel pins, and the upward movement of the arms bringing them first into contact with the latches 55, 55, the stripper plate for the moment still continues to rest on the upper section of the mold, so that the cones are held in the mold by the plate resting on the flange 74 of the cone. In this way, the core plate with its cores can be drawn from the molds without disturbing the baked cones. The further upward movement of the core plate, however, carries with it the stripper plate. Next the lifting arms 61, 62 come in contact with the flange 75 on the plate 18 carrying the upper mold sections, and the upper sections of the mold will be lifted. Before the separation of the upper section from the lower section of the molds, however, the lugs on the lifting arms 61, 62 come in contact with the projecting heel 76 of the hooks 52 and disconnect the hooks from the pins 54, so as to allow of this separation. The edge of the flange on the plate 18 is slotted so as to allow for the passage of the upper arms 58, 59, without disturbing the mold section, and to provide for this, the arms 61, 62 are set inside of the arms 58, 59, as indicated in Fig. 6. When the upper section of the molds has been thus lifted, the plate 17 will carry with it the baked cones as the cones will be supported by the flange or lip 74 thereon, and the mold plates will be in the position shown in Fig. 10, in which 77 represents the baked cones. The movement of the operating wheel from left to right is now stopped, and by passing a board underneath the tips of the cones and raising it, they can be easily pushed out and will drop away from the mold section, as illustrated in dotted lines in Fig. 10. The shaft is then rotated from right to left to bring back the upper section of the mold into position on the lower section. The molds and cores are greased and the batter poured into the molds, and then the core plate with its cores is brought down and locked in position, the hooks 52 engaging under the pins 54. During this return movement of the shaft to bring the molds and core plates into position, the roller 44 on the arm 45 has been outside the locking lever, and at the end of the full return movement the roller has displaced the arm 50 and passed to the left of the locking lever. During all of this movement, therefore, the molds have been locked in position by the locking lever, the lug 41 engaging in the slot 37 in the plate 15. The operator then proceeds to rotate the molds by turning the operating handle from right to left a quarter of a turn. This brings the roller into contact with the locking lever and raises the lug 41 out of its engagement with the slide in the mold frame, and the pin 30 is shifted by the beveled segment 31 into engagement with the groove in the spider 10, and the mold frame thus becomes locked to the driving shaft and is rotated a quarter of a turn. At the end of this quarter turn, the roller 44 passes beyond the end of the locking lever 42 and the weighted arm 48 rocks the lever, bringing the locking lug 41 into the locking slot 37 of the mold frame. This rotation of the molds a quarter of a turn has brought another section of the molds to the top and the operator then proceeds as before to rotate the operating wheel from left to right, raising the core plate, the cores and the upper sections of the molds and releasing the baked cones, which are removed as hereinbefore described. The cores and molds are then greased, the batter supplied in any convenient way, the plates brought back to position and the apparatus again rotated a quarter of a turn. In this way, the process is practically continuous.

In order that, as the molds are baked, the batter may be gradually compressed and obtain a more uniform baking, and more perfect cones, I mount on each core plate, lengthwise thereof, at the middle portion, a roller 78, this roller being held in position by lugs 79, 79 on the upper plate. There is a roller for each of the four sections. The ends of these rollers ride around, as the molds are rotated, on an internal flange 80 formed on the inner face of the plates 3 and 4. This flange is indicated by the dotted line 80 in Fig. 3. The flanged surface is formed eccentric of the center of the operating shaft 7, so that as the molds are rotated, the rollers and with them the core plates will be pressed in to the main body of the molds. In order to more effectually obtain this pressure and distribute it uniformly, I provide an intermediate supporting plate 81, for the rollers which is formed with eccentric surfaces to correspond with the flange 80.

In order that during the baking operation, the molds may be inclosed on top, as well as on the sides, I provide side plates for each side of the machine, and top covers 82, 83, the sides permanently fixed in place to form with the end plates 2 and 3 an oven, and the top covers 82, 83 can also be permanently secured in place.

What I claim as new, and of my invention and desire to secure by Letters Patent, is:

1. In a machine of the character specified a mold frame comprising a series of outer mold forms and a separable series of inner core forms, the outer mold forms being divided transversely into two separable parts forming an upper and a lower body portion for each mold form and means for separating the core and the upper portion of the outer mold forms from the lower portion, in succession.

2. In a machine of the character specified a mold frame comprising a series of outer mold forms and a separable series of inner core forms, the outer mold forms being divided transversely into two separable parts forming an upper and a lower body portion for each mold form and a stripper plate with means for loosely suspending the same from the core plate and means for separating the core plate, the stripper plate and the upper portion of the outer mold forms from the lower portion in succession.

3. In a machine of the character specified, a rotatable mold frame carrying a series of molds radially disposed, with the upper portion of each set of molds separable from the body portion, in a plane at right angles to the axes of the molds, a shaft upon which the mold frame is loosely mounted, means for coupling the shaft to the mold frame for the rotation of the shaft in one direction, and means for locking the molds from rotation when the shaft is rotated in the opposite direction.

4. In a machine of the character specified, a rotatable mold frame carrying a series of molds radially disposed, with the upper portion of each set of molds separable from the body portion, in a plane at right angles to the axes of the molds, a shaft upon which the mold frame is loosely mounted, means for coupling the shaft to the mold frame for the rotation of the shaft in one direction, and vertically actuated devices for lifting the separable portion of the molds, and means for coupling the same to the shaft to separate the mold sections when the shaft is rotated in the opposite direction.

5. In a machine of the character specified, a rotatable mold frame carrying a series of molds radially disposed, with the upper portion of each set of molds separable from the body portion, in a plane at right angles to the axes of the molds, a shaft upon which the mold frame is loosely mounted, means for coupling the shaft to the mold frame for the rotation of the shaft in one direction, and vertically actuated devices for lifting the separable portion of the molds, and means for coupling the same to the shaft to separate the mold sections when the shaft is rotated in the opposite direction, and a lock for the mold frame to hold same rigid during the separation of the molds, and means for releasing the lock upon the rotation of the mold frame.

6. In a machine of the character specified, a rotatable mold frame with a plurality of series of molds radially disposed, each series ninety degrees apart, to form four sets, the upper portion of each set of molds separable from the body portion in a plane at right angles to the axes of the molds, a shaft upon which the mold frame is loosely mounted, an arm fixed on the shaft and ratchet grooves on the mold frame, a sliding pin carried by said arm and a fixed cam to shift the pin to enforce engagement with the ratchet grooves, to couple the mold frame to the shaft whereby the sets of molds may be alternately shifted from a vertical to a horizontal position.

7. In a machine of the character specified, a rotatable mold frame carrying a series of molds radially disposed, with the upper portion of the molds separable from the body portion in a plane at right angles to the axes of the molds, a shaft upon which the mold frame is loosely mounted, means for coupling the shaft to the mold frame to rotate the same in one direction, vertically movable slides with arms to engage the separable portion of the molds to raise the same, with connecting mechanism intermediate the slides, and shaft whereby reverse movement of the shaft will actuate the slides to separate the molds.

8. In a machine of the character specified, a rotatable mold frame with a plurality of series of molds radially disposed, each series ninety degrees apart, to form four sets, the upper portion of each set of molds separable from the body portion in a plane at right angles to the axes of the molds, a shaft upon which the mold frame is loosely mounted, an arm fixed on the shaft and ratchet grooves on the mold frame, a sliding pin carried by said arm and a fixed cam to shift the pin to enforce engagement with the ratchet grooves to couple the mold frame to the shaft whereby the sets of molds may be alternately shifted from a vertical to a horizontal position, with one movement of the shaft, vertically movable slides with arms to engage the separable portion of the molds to raise the same, with connecting mechanism intermediate the slides, and shaft whereby reverse movement of the shaft will actuate the slides to separate the molds.

LEWIS H. LANIER

Attest:
ARTHUR H. EWALD,
K. SMITH.